G. W. SHAWK.

Electric-Annunciators.

No. 6,581. Reissued Aug. 3, 1875.

Witnesses.

Geo. H. Tibbitts

Emma Withicomb

Inventor.

Geo. W. Shawk

THE NORRIS PETERS CO. PHOTO-LITHO., WASHINGTON, D. C.

UNITED STATES PATENT OFFICE.

GEORGE W. SHAWK, OF CLEVELAND, OHIO, ASSIGNOR, BY MESNE ASSIGNMENTS, OF PART INTEREST TO CHARLES F. UHL, JOHN GRIBBEN, H. A CROSSLEY, AND W. H. CROWELL.

IMPROVEMENT IN ELECTRIC ANNUNCIATORS.

Specification forming part of Letters Patent No. 139,826, dated June 10, 1873; reissue No. 6,581, dated August 3, 1875; application filed March 20, 1874.

*To all whom it may concern:*

Be it known that I, GEORGE W. SHAWK, of Cleveland, county of Cuyahoga, State of Ohio, have invented a new and Improved Electro-Magnetic Annunciator, of which the following is a specification:

This improvement relates to an electro-magnetic annunciator in which the numbered or lettered plate is maintained in a fixed position by means of the residual magnetism of the electro-magnets employed; and to this end the invention consists, first, in the construction and arrangement of the armature and electro-magnets of an annunciator, in such a manner that the armature, upon its being attracted toward the electro-magnets as the circuit is closed, will be brought in direct contact with the ends of the cores, and then be retained in a fixed position after the circuit is broken by the residual magnetism of the electro-magnets in connection with an independent mechanical power, whereby the armature may be released from the cores by a positive mechanical action; second, in the combination of a numbered or lettered plate with the armature of an electro-magnet, the armature being arranged relatively to the ends of the cores in such a manner that, the circuit being closed, the armature will be attracted toward the electro-magnets by magnetic influence, and retained in direct contact with the same by residual magnetism, thereby serving as the actuating and retaining mechanism of the lettered plate; third, in the combination of a weighted arm with the side of the armature opposite the numbered or lettered plate, to counterbalance the said plate and insure the ready attraction of the armature to its cores by the employment of a comparatively feeble electric current; fourth, in combination with an armature of an electro magnet, which is retained in direct contact with the cores of the magnet by residual magnetism, of a crank-shaft, having an arm secured thereto, whereby the armature carrying the lettered plate is detached from the cores by a single revolution of the crank-shaft.

Figure 3:
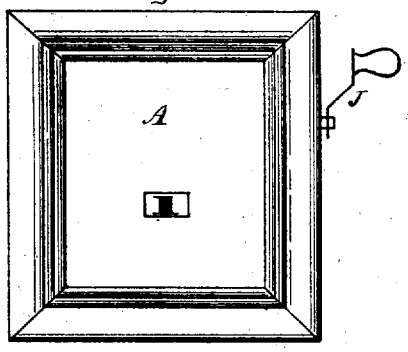
Figure 2:
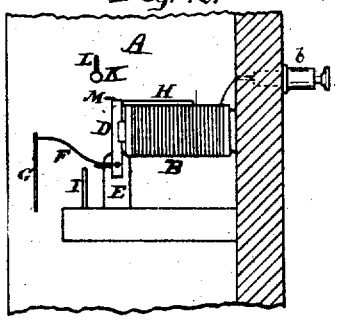
Figure 1:
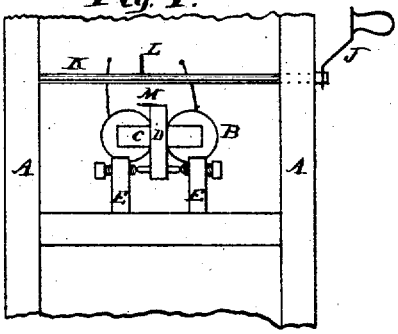

In the drawings, Figure 1 is a front elevation of my improvement, the front plate removed showing the relation of the armature to the magnet. Fig. 2 is a vertical section of the same. Fig. 3 is a front view of the box.

A represents the box for containing the working parts of the annunciator. B is an electro-magnet secured to the back of the box, and placed in a circuit embracing the battery, and the room from which the signal is to be sent. C is the armature attached to the upright bar D, the lower end of which is suspended or pivoted by small journals in a yoke, E, setting on the bottom of a box, so that the bar may be tilted back and forth. In front of the bar D is an arm, F, extending forward and carrying a plate, G, upon which is a bar to counterbalance the arm F. There is an arm, H, attached to the top of the bar D, to prevent the armature from falling forward too far. There is a small post, I, in front of the yoke E, for the arm F to rest upon when tilted forward. K is a shaft extending through the box just below the armature, and operated by a crank, J, on the outside of the box. A small arm, L, on the shaft K is made to throw the armature off from the magnet by a positive and direct mechanical action when the shaft K is revolved by the crank J, by striking against a small arm, M, projecting from the top of the bar D.

To impart the desired movement to the numbered plate, the latter device is connected to the armature by a lever of sufficient length to carry the plate through the desired space. With the plate secured to the connecting-lever at a sufficient distance from its fulcrum to secure the desired movement of the plate, a strong current of electricity would be required to attract the armature to the magnets, and thus proportionately enhance the expense of maintaining the batteries. To obviate this expense a weighted lever is secured to the armature opposite to the numbered plate to counterbalance the weight of the latter, and thereby insure the attraction of the armature to its magnets by the employment of a slight electric current.

The operation is as follows: The armature being tilted forward, the bar or plate is down below the opening in the glass front out of view, when the electric current is completed by any suitable device. The armature is attracted to the magnet, striking it with a click, and is retained in contact by residual magnetism, and the bar or plate is raised to view, and remains there until thrown back by the positive action of the crank.

A bell may be arranged to sound in connection with the movement of the armature, if desired.

What I claim, and desire to secure by Letters Patent, is—

1. In an electric annunciator, the combination of an electro-magnet with an armature, which is actuated by magnetic attraction, and retained in direct contact with the cores of the electro-magnet by residual magnetism, in connection with independent mechanism, substantially as described, whereby the armature is forced from the cores by positive mechanical action, substantially as set forth.

2. In an electric annunciator, the combination of a numbered or lettered plate with the armature of an electro-magnet, the armature adapted to be retained in direct contact with the cores of the magnet by residual magnetism, substantially as described.

3. In an electric annunciator, the combination of a weighted arm with the armature of an electro-magnet, to which a lettered or numbered plate is secured for the purpose of counterbalancing the weight of the said plate, and thereby insure the attraction of the armature to the magnet by a light electric current, substantially as described.

4. In an electric annunciator, the combination of a crank-shaft, having an arm secured thereto, with the armature of an electro-magnet, to which a lettered or numbered plate is secured, for the purpose of releasing the armature from the electro-magnet, and allow the letters or numbers to move away from view, substantially as described.

GEO. W. SHAWK.

Witnesses:
GEO. W. TIBBITTS,
EMMA WITHICOMB.